Nov. 23, 1965     W. I. FLEMING ETAL     3,219,252
PALLET CONSTRUCTION
Original Filed Jan. 27, 1961     2 Sheets-Sheet 1
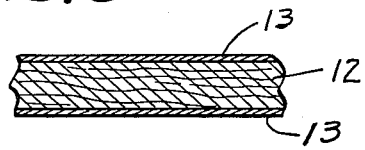
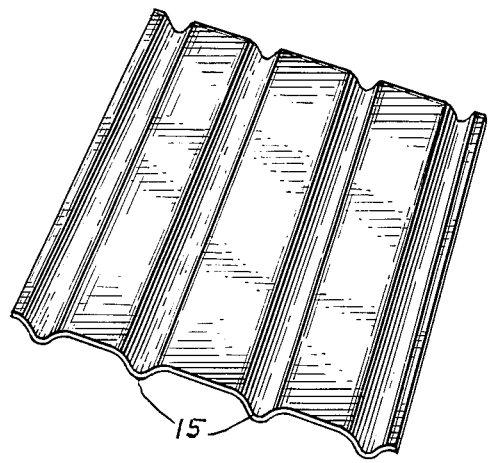
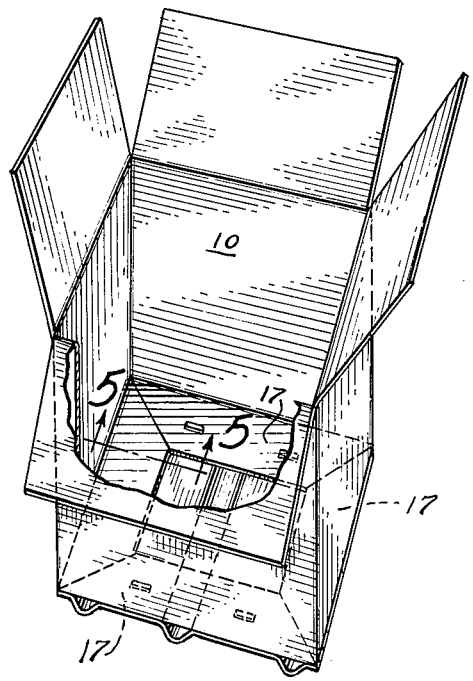
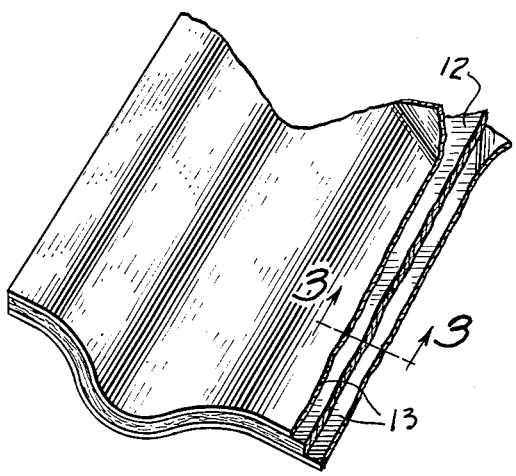
INVENTORS:
WALTER I. FLEMING
HERBERT A. KREILICK
BY
ATTYS.

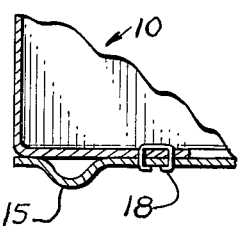
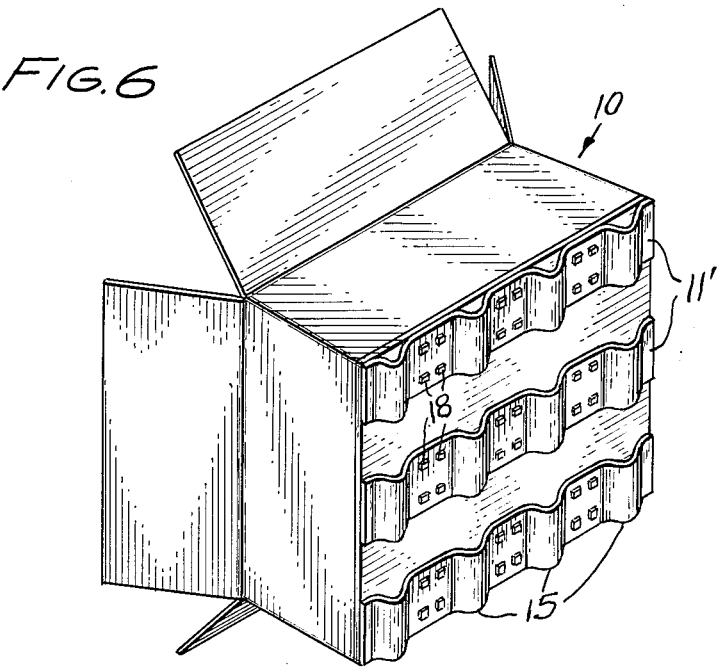
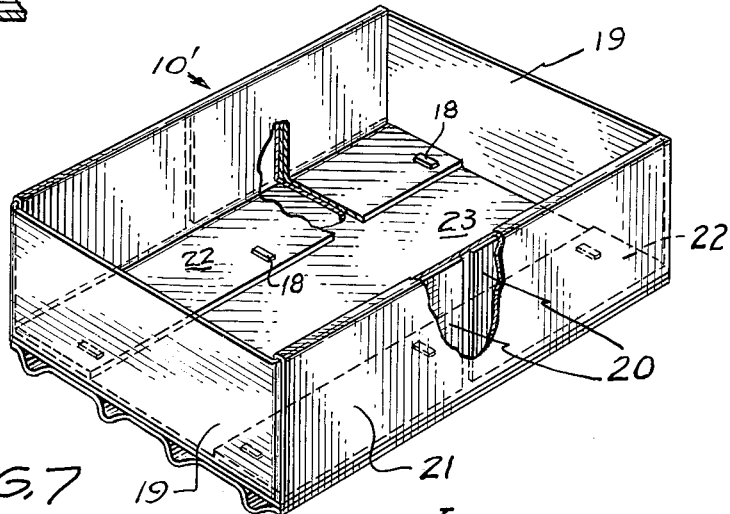

United States Patent Office 3,219,252
Patented Nov. 23, 1965

3,219,252
PALLET CONSTRUCTION
Walter I. Fleming, Dundee, Ill., and Herbert A. Kreilick, Webster Groves, Mo., assignors to Woodkor Corporation, a corporation of Illinois
Original application Jan. 27, 1961, Ser. No. 85,430, now Patent No. 3,135,228, dated June 2, 1964. Divided and this application Oct. 4, 1963, Ser. No. 313,848
3 Claims. (Cl. 229—6)

This application is a division of application Serial No. 85,430, filed January 27, 1961, now Patent No. 3,135,228, dated June 2, 1964.

This invention relates to improvements in pallets used for mounting loads for storage and/or ready for handling by fork-lift trucks.

The main objects of this invention are to provide an improved structure of pallets used for stacking loads for either storage or for transport from place to place on fork-lift trucks; to provide pallets of this kind of an improved material and stru tural form including a container mounted thereon; and to provide an improved pallet of this kind which by virtue of the material and structural form is very inexpensive to manufacture and in use of great stable rigidity and durable utility.

Several embodiments of this invention have been developed some of which are the subject of copending application Serial No. 85,430 of which this is a division now Patent No. 3,135,228, dated June 2, 1964.

In the particular adaptation shown in the accompanying drawing:

FIGURE 1 is a perspective view of one form of a base element structured in accordance with this invention;

FIG. 2 is a very much enlarged, fragmentary, perspective view illustrative of the material and structural form of the base element shown in FIG. 1;

FIG. 3 is a much enlarged, fragmentary, cross-sectional view taken on the plane of the line 3—3 of FIG. 2, showing the relative thicknesses of the laminated materials;

FIG. 4 is a perspective view of a carton-type pallet the base element for which is of the form shown in FIG. 1, parts being broken away;

FIG. 5 is an enlarged, fragmentary, sectional detail taken on the plane of the line 5—5 of FIG. 4, showing a staple-bonding of carton and base element;

FIG. 6 is a bottom perspective view of a carton-type pallet wherein the base element comprises a plurality of narrow strips of a structure and contour shown in FIG. 1; and FIG. 7 is a perspective view, with parts broken away, of a carton-type pallet without a top.

The essential concept of this invention involves a carton mounted on and bonded to a base element structured from thin layers of tough-textured paper or thin wood-veneer laminated over a comparatively-thick wood-veneer core and having spaced parallel corrugations extending in one dimension thereof.

A pallet embodying the foregoing concept comprises a carton 10 of the conventional cardboard structure, attached to a base element 11 (11'), composed of wood-veneer core 12 over which is laminated thin paper sheets 13 (or thin wood-veneer), the carton being bonded to the contacting areas of the supporting base element 11 (11').

The core 12 of this base element 11, preferably is wood-veneer such as used for the core of plywood. The laminated sheets 13 preferably are either tough-textured paper such, for example, as that commonly referred to as "kraft" paper, or a very thin wood-veneer. A "kraft" paper laminated wood-veneer core of this kind is available commercially and known in the trade by the name "Craveneer."

Whatever the materials constituting the base element 11, it is formed with parallel corrugations 15 extending in one dimension of the base element 11. As shown in FIGS. 1–5, 7, there are four such corrugations, two of which are disposed inwardly adjacent the respective lateral edges of the base element 11 and two of which are evenly spaced between the two laterally-disposed corrugations. In FIG. 4 there are three such corrugations, two of which are disposed inwardly adjacent the lateral edges of the base element 11 and the third is disposed substantially medially of the two laterally-disposed corrugations.

In the carton-type pallet as herein shown in FIG. 4, the carton 10 may be of conventional form wherein the bottom comprises narrow flaps 17 mitered along their edges to permit their disposition in a comomn plane. Or, it may be of the conventional form wherein the bottom flaps are dimensioned to overlap and, generally, are bonded together in their overlapping areas.

In the adaptation shown in FIGS. 4 and 5 the carton 10 is of the first of the above-mentioned forms. These flaps 17 here are shown bonded by staples 18 to contacting portions of the base elements 11 between the parallel corrugations 15. The flaps 17 also might be bonded to base element 11 by an adhesive, or an adhesive might be the alternative to staples.

In the adaptation shown in FIG. 6 the carton 10 is of the second of the above-mentioned forms. Here the base element 11' consists of three narrow corrugated strips of the same contour as the base element shown in FIG. 1. These three strips are of lengths equal to one dimension of the carton bottom. The strips are bonded to the bottom of the carton 10 in spaced parallel relationship to the other dimension of the bottom with the corrugations of the three strips aligned in parallel relationship to the one bottom dimension. The bonding of the strips to the carton bottom may be by staples and/or an adhesive. The staples are shown at 18.

In FIG. 7 the carton box 10' shown is of less depth than the carton of FIGS. 4 and 6 and is manufactured without the usual top flaps. The side walls 19 are provided with integrally formed flaps 20 which are bent at right angles inwardly as clearly shown in the cutaway portion of this figure.

The end flaps 21 are elongated and partially bent over the flaps 20 with the free ends 22 thereof again bent to lie in a plane parallel to the box bottom wall 23 and be anchored thereto by staples 18 which also extend into the areas of the base element between the parallel corrugations 15.

It should be obvious that the "strip" base element, shown in FIG. 6, might readily be used with the carton 10' of FIG. 7.

However heavily-loaded such a carton pallet may be, there is no likelihood of the collapse of the base element 11 (11'). This is assured since there can be no spreading of the base element because of the staple and/or adhesive bonding of the contacting areas of the carton bottom with the base element between its corrugations.

Although but one specific embodiment of this invention is herein shown and described it will be understood that details of the construction shown may be altered or omitted without departing from the spirit of the invention as defined by the following claims.

We claim:
1. A load-supporting pallet comprising a carton, a base element structured from thin layers of tough-textured paper laminated on a continuous wood-veneer core and formed with spaced parallel corrugations extending in one dimension, the bottom of the carton constituting a cargo-supporting deck overlying one corrugated face of the base element and bonded to the base element along contacting areas to retain the corrugated character of the base element when subjected to supporting a load.

2. A load-supporting pallet as set forth in claim 1 wherein the base element is one piece of the same dimension as the bottom of the carton.

3. A load-supporting pallet as set forth in claim 1 wherein the base element is in the form of separate strips each of a length equal to one dimension of the carton bottom and are disposed in spaced parallel relationship to the other dimension of the carton bottom with the corrugations of the strips aligned in parallel relationship to the one dimension of the carton bottom.

References Cited by the Examiner
UNITED STATES PATENTS

| | | | |
|---|---|---|---|
| 1,892,527 | 12/1932 | Gray | 229—14 |
| 2,544,743 | 3/1951 | Vrabcak | 108—55 X |
| 3,073,500 | 1/1963 | Goodrich et al. | 229—14 |
| 3,135,128 | 6/1964 | Fleming et al. | 108—55 |

FRANKLIN T. GARRETT, *Primary Examiner.*